United States Patent [19]
Foster et al.

[11] 4,024,214
[45] May 17, 1977

[54] METHOD OF PREPARING $\beta''$-Al$_2$O$_3$

[75] Inventors: Luther Morris Foster, Chappaqua; John Edward Scardefield, New Hamburg, both of N.Y.

[73] Assignee: International Business Machines Corporation, Armonk, N.Y.

[22] Filed: Feb. 17, 1976

[21] Appl. No.: 658,314

[52] U.S. Cl. .................... 423/600; 429/104
[51] Int. Cl.$^2$ .......................... C01F 7/04
[58] Field of Search .......... 423/600; 136/6 FS, 20, 136/120 FC; 429/33, 46, 104

[56] References Cited
UNITED STATES PATENTS

| | | | |
|---|---|---|---|
| 2,454,227 | 11/1948 | Smith et al. | 423/600 |
| 3,714,343 | 1/1973 | Sato et al. | 423/600 |
| 3,795,723 | 3/1974 | Clemlenen et al. | 423/600 |
| 3,859,427 | 1/1975 | Francis et al. | 423/600 |

OTHER PUBLICATIONS

Newsome et al., "Alumina Properties", Aluminum Co. of America, Pittsburg, 1960, p. 46.
McGowan, "Dissertation Abstracts, Int. B.," vol. 34(5), 1973, p. 2003.

*Primary Examiner*—Herbert T. Carter
*Attorney, Agent, or Firm*—George Baron; Bernard N. Wiener

[57] ABSTRACT

$\beta''$-Al$_2$O$_3$ is a highly desirable material for serving the double function of solid electrolyte and separator in a rechargeable battery that employs sodium, Na, as the anode and sulfur, S, as the cathode. But conventional means for manufacturing the $\beta''$-Al$_2$O$_3$ require temperatures between 1400° and 1600° C. By reacting $\theta$-Al$_2$O$_3$ with Na$_2$O, or a compound that yields Na$_2$O on decomposition, the desired $\beta''$-Al$_2$O$_3$ is obtained at temperatures as low as 950° C.

1 Claim, 1 Drawing Figure

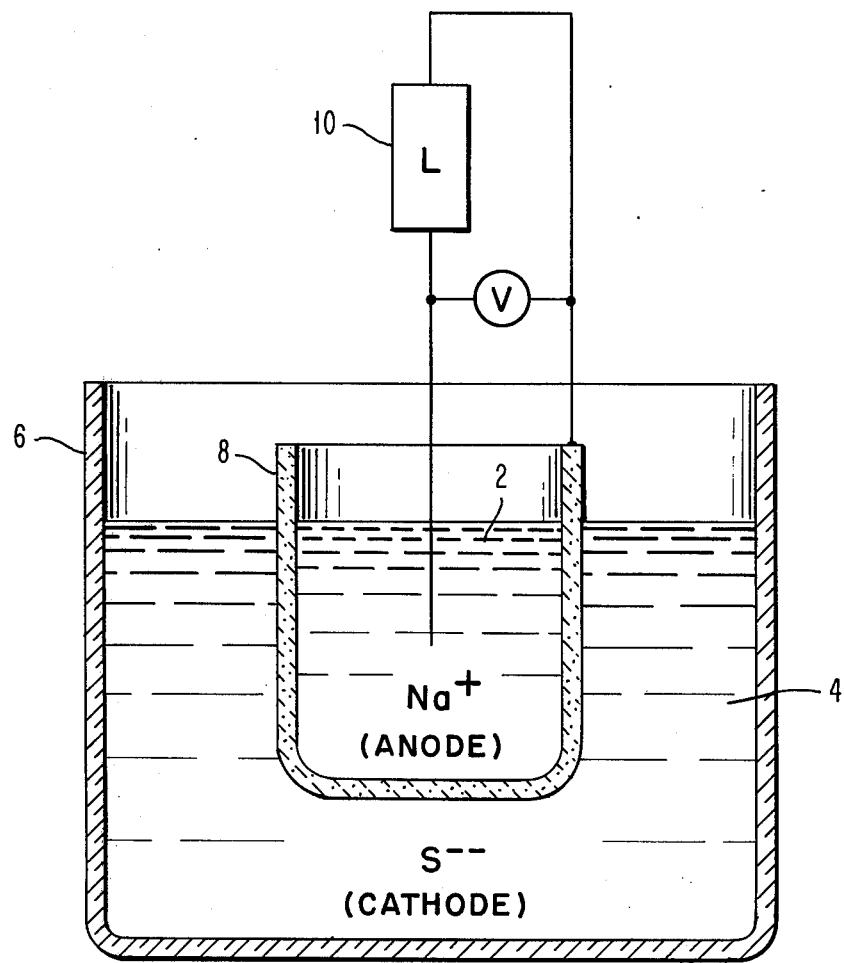
PRIOR ART

METHOD OF PREPARING $\beta''$-Al$_2$O$_3$

BACKGROUND LEADING UP TO THE INVENTION

In an article by R. C. DeVries and W. L. Roth entitled "Critical Evaluation of the Literature Data on Beta Alumina and Related Phases: I, Phase Equilibria and Characterization of Beta Alumina Phases" which appeared in the Journal of the American Ceramic Society of July 1969, Vol. 52, No. 7, pp. 364–369, the authors discuss data in the literature on the system Na$_2$O-Al$_2$O$_3$ particularly the sodium aluminate Na$_2$OxAl$_2$O$_3$, where $x$ is of the order of 5–8, which has become known as $\beta$-Al$_2$O$_3$. $\beta$-Al$_2$O$_3$, and a crystallographic variant of it, $\beta''$-Al$_2$O$_3$, are used as separators in the type of Na-S battery shown and described in U.S. pat. No. 3,404,035 to Kumer et al., which issued Oct. 1, 1968. In such Na-S battery, the anodic reactant is separated from the cathodic reactant by a solid which serves as a barrier to mass liquid transfer, but is selectively conductive with respect to cations of the anodic reactant and substantially impermeable to ions that are formed in the cathodic reactant. Thus, the separator is composed of material that will admit of the transfer of the ions of the anodic reactant through the separator and into the cathodic reactant during the discharge reaction and admit of their selective return when a reverse electric current is passed through the cell during recharging. Moreover, the cathodic reactant, together with the separator, provides a sufficient barrier to free electron flow in the internal portion of the electrical circuit to permit a difference of potential to develop at the respective electrodes when the cell is in operation.

DETAILED DESCRIPTION OF THE DRAWINGS

The sole FIGURE represents the prior art as exemplified by U.S. Pat. No. 3,404,035 to Kummer et al wherein a battery, useful as power sources in motor vehicles, comprises an anode 2 of sodium (Na) and a sulphur (S) solution that serves as cathode 4 that is supported within a sulphur-resistant container 6. Separating the anode 2 from cathode 4 is a solid electrolyte 8 that is composed of either of two materials, $\beta$-Al$_2$O$_3$ or $\beta''$-Al$_2$O$_3$, that is employed in a sintered ceramic form. The $\beta$-Al$_2$O$_3$ or $\beta''$-Al$_2$O$_3$ are permeable to the sodium ion Na$^+$, but to no other component of the sodium-sulphur battery. During discharge of the battery, Na$^+$ ions diffuse across separator 8 into the cathode 4 compartment where they react with S$^{--}$ ions to complete the electro-chemical reaction Na$^+$+S$^{--}$=Na$_2$S (or a polysulfide). The free energy of the reaction appears as a voltage across the terminals of the battery and such voltage can be applied to a load 10. The $\beta$ form of Na$_2$OxAl$_2$O$_3$ has the ideal crystallographic formula Na$_2$O11Al$_2$O$_3$, but in practice there is excess soda so the Al$_2$O$_3$/Na$_2$O ratio is more likely in the range of 5–8. The $\beta''$ form generally has slightly more soda than the $\beta$ form, which can contribute to a higher conductivity. However, the greater conductivity of the $\beta''$ form is principally attributable to the slight change in crystallographic arrangement of the atoms to provide less resistance to ion current flow. The $\beta''$ phase is preferred because of this higher conductivity when used as a component of a battery.

Heretofore, $\beta''$-Al$_2$O$_3$ was generally prepared by reacting sodium oxide or some compound such as sodium carbonate (Na$_2$CO$_3$) or sodium nitrate (NaNO$_3$), which yield sodium oxide upon decomposition, with the common commercial form of calcined alumina, $\alpha$-Al$_2$O$_3$, which has the corundum structure. Variations of that procedure involve use of water soluble aluminum salts, which decompose the $\alpha$-Al$_2$O$_3$ on heating, as the aluminum source. In any case, when the $\alpha$-Al$_2$O$_3$ is employed, a temperature of 1400° to 1600° C is required to obtain substantially complete reaction to the desired $\beta''$-Al$_2$O$_3$ product. At the higher end of this temperature range some of the less desirable $\beta$-Al$_2$O$_3$ phase forms as well.

This invention eliminates the need for such high temperatures by employing theta-alumina ($\theta$-Al$_2$O$_3$) as the starting material to react with a soda containing compound such as sodium carbonate. $\theta$-Al$_2$O$_3$, although less commonly known than $\alpha$-Al$_2$O$_3$, is a readily available article of commerce. For example, by reacting $\theta$-Al$_2$O$_3$ with Na$_2$CO$_3$ in intimate admixture in the proportion of 6 moles of $\theta$-Al$_2$O$_3$ to one mole of Na$_2$CO$_3$, the CO$_2$ was lost and substantial conversion to $\beta''$-Al$_2$O$_3$ of the composition Na$_2$O6Al$_2$O$_3$ had occured at 950° C and was complete, as evidenced by X-ray examination of the product, at 1050° C. Heating times of 2 to 65 hours have been employed with similar results.

The substituted starting material of $\theta$-Al$_2$O$_3$ for $\alpha$-Al$_2$O$_3$ not only requires a lower temperature (by about 400°–500° C) to obtain the desired end product of $\beta''$-Al$_2$O$_3$, but the reaction at the lower temperature does not yield the undesired $\beta$-Al$_2$O$_3$ phase that exists when the higher temperature reaction is relied upon.

The Na—S battery holds promise for becoming widely used for automotive propulsion as well as for energy storage for other purposes. The present invention now permits one to produce a major feature of that invention, namely, the solid electrolyte separator, at a much lower temperature, producing that electrolyte in a more desired form.

What is claimed is:
1. In the method of making $\beta''$ phase Al$_2$O$_3$, the steps of:
    1. mixing $\theta$-Al$_2$O$_3$ with a sodium containing compound sodium carbonate in the proportion to produce the compound Na$_2$O6Al$_2$O$_3$ after loss of CO$_2$; and
    2. heating said mixture to a temperature of 950° C to 1050° C for at least two hours to obtain substantially complete conversion to $\beta''$-phase Al$_2$O$_3$.

* * * * *